J. Andrews,
Hanging Saws,
N° 32,503.    Patented June 11, 1861.

Witnesses:
J W Coomly
R. S. Spencer

Inventor:
John Andrews
Per Munn & Co
Attorneys

UNITED STATES PATENT OFFICE.

JOHN ANDREWS, OF BRUNSWICK, MAINE.

MODE OF SECURING CIRCULAR SAWS TO ARBORS.

Specification of Letters Patent No. 32,503, dated June 11, 1861.

*To all whom it may concern:*

Be it known that I, JOHN ANDREWS, of Brunswick, in the county of Cumberland and State of Maine, have invented a new and useful Improvement in Attaching Circular Saws to Their Arbors; and I do hereby declare that the following is a full, clear, and exact description of the same, reference being had to the annexed drawings, making a part of this specification, in which—

Figure 1:
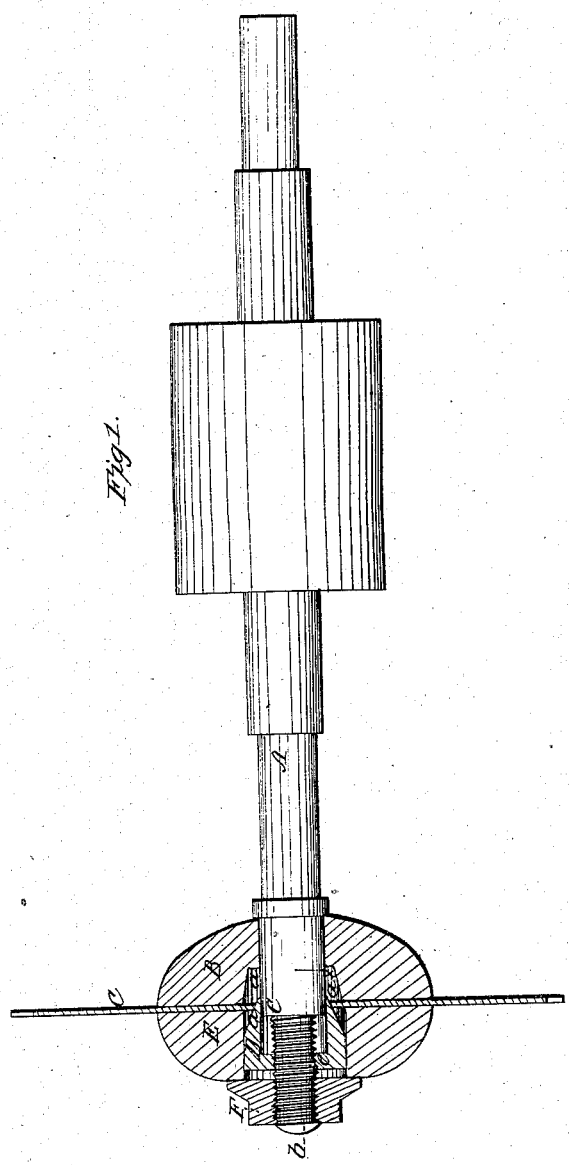
Figure 2:
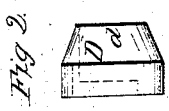

Figure 1 is a view of the arbor of a circular saw having a saw secured on it by my invention which is bisected centrally and in a direction longitudinal with the arbor. Fig. 2 an external view of an adjustable tube or bush pertaining to the same.

Similar letters of reference indicate corresponding parts in the two figures.

In adjusting circular saws on their shafts or arbors great difficulty is generally experienced in consequence of the variation in the diameter of the eyes of the saws. When too large the eyes require to be bushed in order that they may fit their arbors and when too small they require to be filed out.

The object of the within described invention is to obviate this difficulty, and to this end, I employ a sliding or adjustable bush in connection with two hollow collars one of which is fixed and the other movable upon the mandrel, the hollow movable collar being adjusted by a nut upon the extremity of the mandrel all as hereinafter set forth.

To enable those skilled in the art to fully understand and construct my invention, I will proceed to describe it.

A. represents the shaft or arbor of a circular saw, and B. is a fixed collar on the arbor, said collar having a circular or taper recess $a$ made in it, concentric with the arbor A. The outer or face side of the collar B. is a plane at right angles with the arbor and forms a bearing for the circular saw C. at one side. The end of the arbor A. beyond the collar B. has a screw thread $b$. cut or formed on it, said screw extending from a point nearly in line with the face of the collar B. to the end of the arbor, a smooth space $c$. being allowed next the face of the collar B. to receive the saw C. as shown clearly in Fig. 1.

D. is a sliding or adjustable bush which externally is of conical or taper form at one end as shown at $d$. the remaining external part being cylindrical. This bush is tapped at its cylindrical end as shown at $e$. and is fitted on the screw $b$. of the arbor, and said bush is made hollow so that on being turned in the proper direction its conical part $d$. may be adjusted in the eye $a^x$. of the saw and over the arbor adjoining screw $b$. as will be fully understood by referring to Fig. 1.

E. is a loose hollow collar which is fitted on the arbor A. and over the bush D. This collar E. is about equal in dimensions to the fixed collar B. and its face side abuts against the saw C. at the side opposite to that which is in contact with collar B. The loose collar and nut are in common use and well known. But the loose collar is always made solid and so far as I am aware it is entirely new to have it made hollow as herein shown.

F. is a nut on the screw $b$. which nut bears against the collar E.

From the above description it will be seen that by turning the bush D. on the screw $b$. the conical part $d$. of the bush may be forced into the eye $a^x$. of the saw and the latter secured firmly on its arbor, and it will also be seen that the adjustment of the bush D. admits of the eye $a^x$. being filled whether large or small in diameter, and consequently saws with various sized eyes may be firmly secured on one and the same arbor. No difficulty therefore will be experienced in adjusting saws on their arbors, owing to the variation in the size of the eyes of the former.

Having thus described my invention, what I claim as new and desire to secure by Letters Patent; is—

The combination in the manner substantially as herein shown and described of the hollow adjustable collar E, conical bush D and fixed recessed collar B, with each other and with the saw C, and arbor A, all as set forth for the purpose specified.

JOHN ANDREWS.

Witnesses:
SAMUEL S. WING,
J. P. STORER.